United States Patent
Kim et al.

(10) Patent No.: US 9,973,636 B2
(45) Date of Patent: May 15, 2018

(54) MOBILE TERMINAL

(71) Applicant: LG ELECTRONICS INC., Seoul (KR)

(72) Inventors: Younseob Kim, Seoul (KR); Seoungmyun Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/026,507

(22) PCT Filed: Feb. 19, 2014

(86) PCT No.: PCT/KR2014/001345
§ 371 (c)(1),
(2) Date: Mar. 31, 2016

(87) PCT Pub. No.: WO2015/050296
PCT Pub. Date: Apr. 9, 2015

(65) Prior Publication Data
US 2016/0227047 A1    Aug. 4, 2016

(30) Foreign Application Priority Data
Oct. 1, 2013    (KR) .................. 10-2013-0117309

(51) Int. Cl.
*H01M 2/02*    (2006.01)
*H04M 19/04*    (2006.01)
*H04B 1/3827*    (2015.01)

(52) U.S. Cl.
CPC ........ *H04M 19/047* (2013.01); *H04B 1/3833* (2013.01)

(58) Field of Classification Search
CPC ...... H02K 5/04; H02K 5/24; A45C 2011/002; H02J 7/0044; H02J 7/025; H04B 1/3888; H04B 1/3833; H04M 1/026; H01M 2/1022; H01M 2/0434; H01M 2/06; H01M 2/1055; H01M 2/24; H01M 2/305
See application file for complete search history.

(56) References Cited

U.S. PATENT DOCUMENTS

| | | |
|---|---|---|
| 2010/0259214 A1 | 10/2010 | Sip |
| 2012/0146433 A1 | 6/2012 | Jeong et al. |
| 2012/0235636 A1* | 9/2012 | Partovi ............... H02J 7/025 320/108 |
| 2013/0200732 A1* | 8/2013 | Jun .................. H02K 33/00 310/25 |
| 2014/0159839 A1 | 6/2014 | Kim |

FOREIGN PATENT DOCUMENTS

| | | |
|---|---|---|
| JP | 2000-324215 A | 11/2000 |
| KR | 10-1114488 B1 | 2/2012 |
| KR | 10-1257199 B1 | 4/2013 |
| KR | 10-2013-0054552 A | 5/2013 |

* cited by examiner

*Primary Examiner* — Quan M Hua
(74) *Attorney, Agent, or Firm* — Birch, Stewart, Kolasch & Birch, LLP

(57) ABSTRACT

There is disclosed a mobile terminal including a case comprising an electric control unit in which electric/electronic parts are mounted, a battery cover coupled to a rear surface of the case, and a vibration motor coupled to an inner surface of the battery cover.

9 Claims, 6 Drawing Sheets

[Fig. 1]
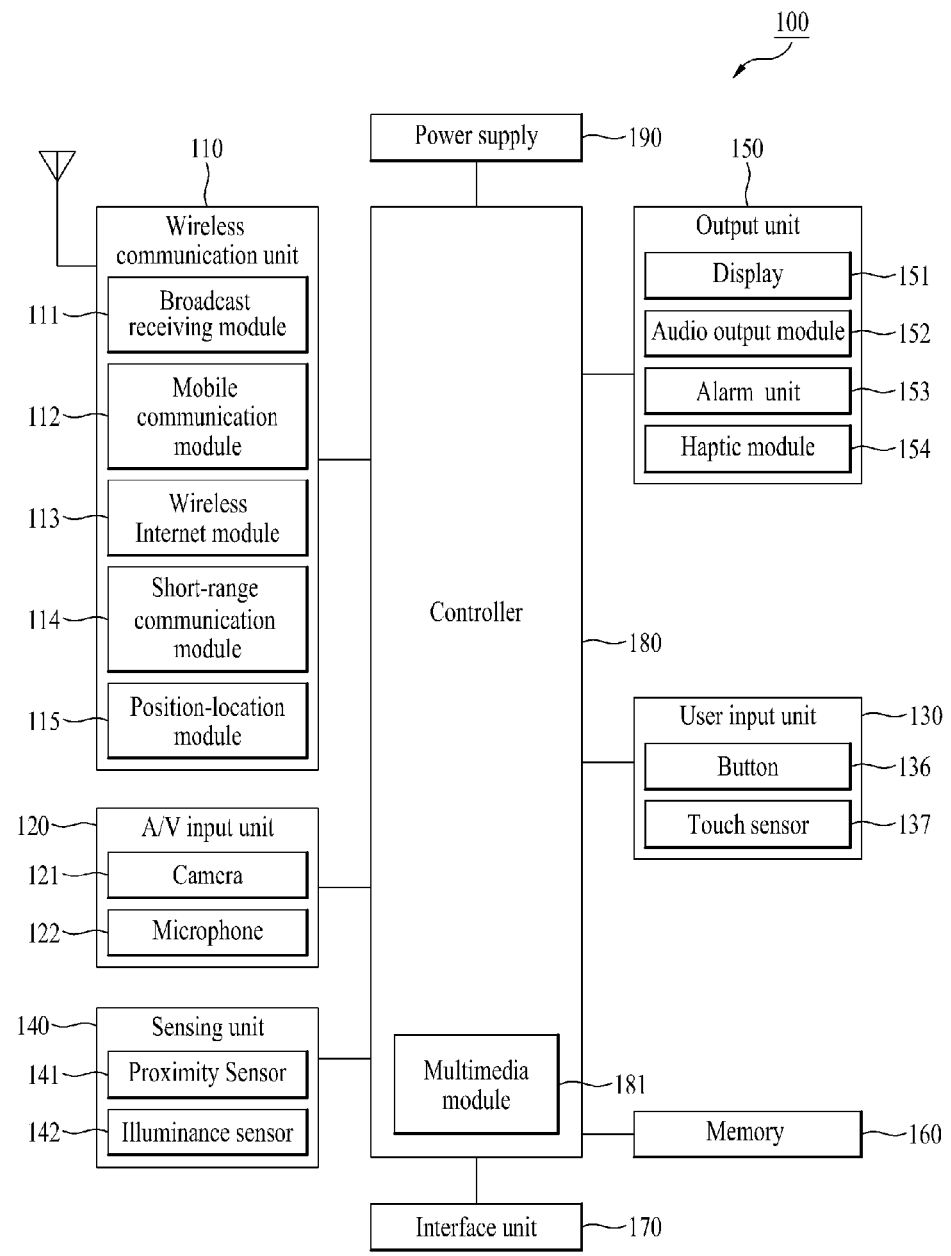

[Fig. 2]
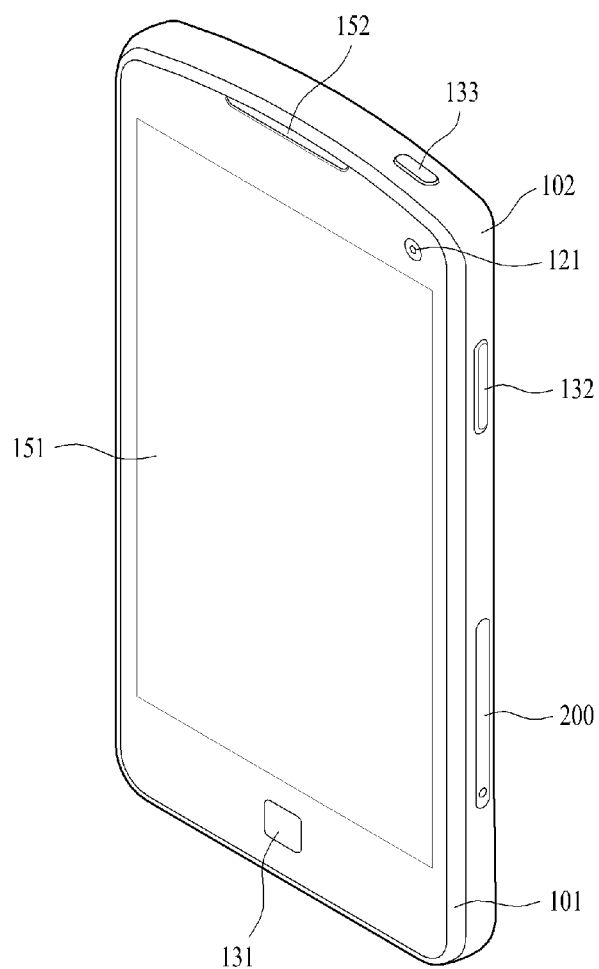

[Fig. 3]
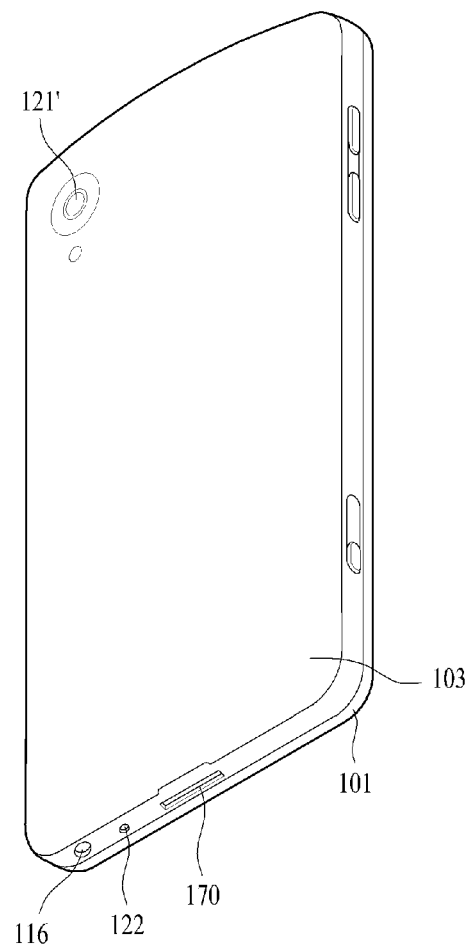

[Fig. 4]
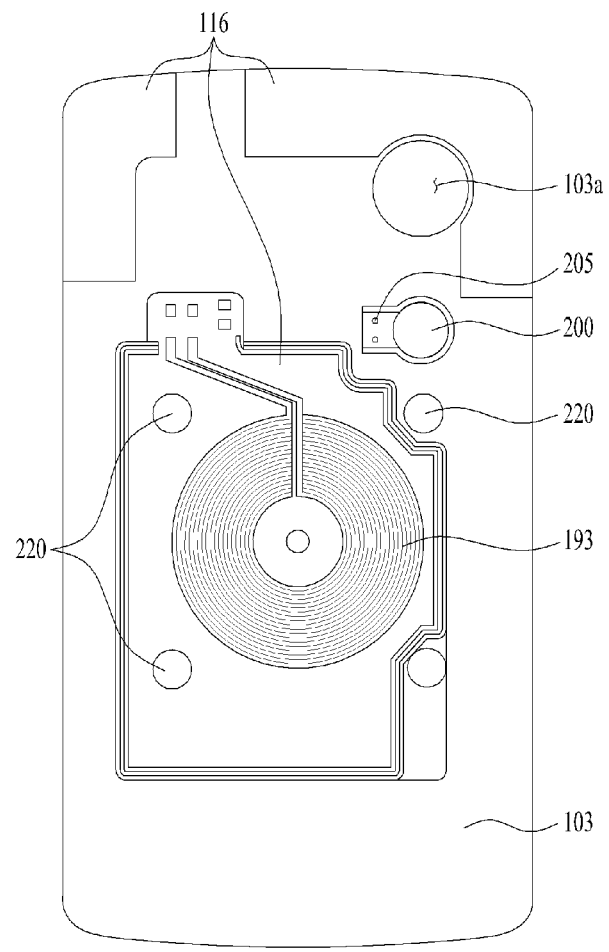
[Fig. 5]
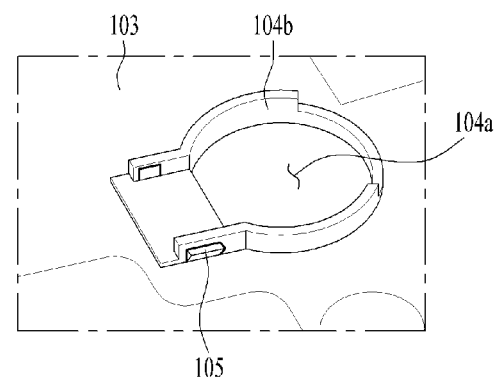

[Fig. 6]
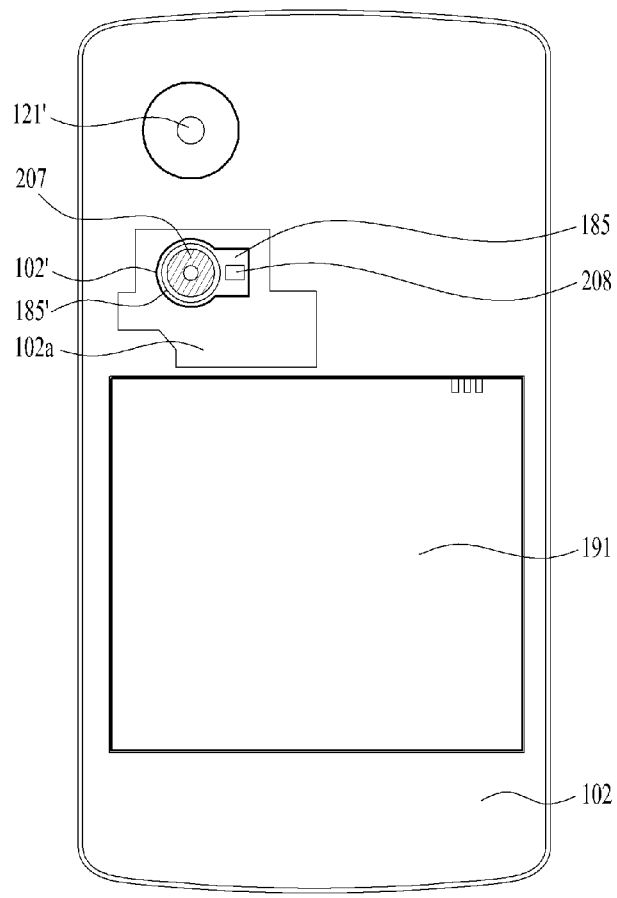
[Fig. 7]
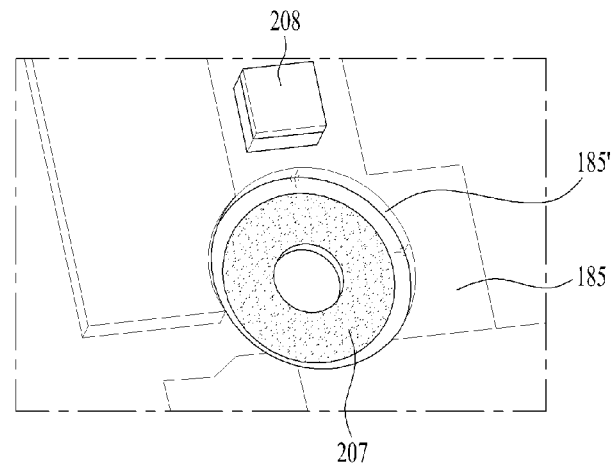

[Fig. 8]
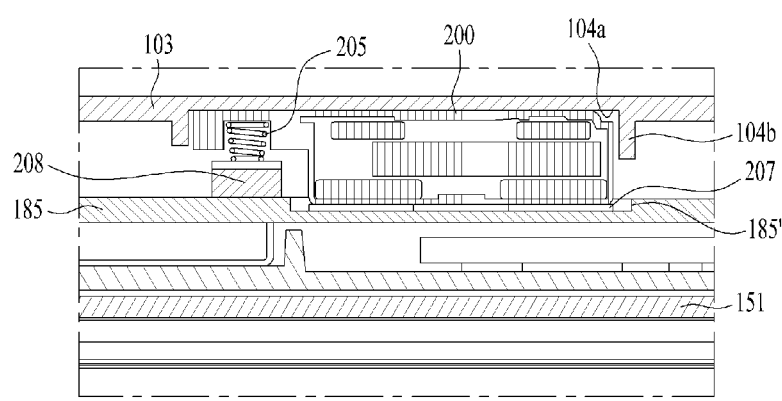

MOBILE TERMINAL

TECHNICAL FIELD

Embodiments of the present invention relate to a mobile terminal having an improved vibration effect of a motor.

BACKGROUND ART

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display.

A vibration motor configured to realize vibration of a mobile terminal is typically mounted in an electric control unit provided in a case and disposed on a printed circuit board. However, the vibration generated by the vibration motor might be directly delivered to electric/electronic parts mounted in the printed circuit board and the electric control unit, such that the durability and reliability of the electric/electronic parts could deteriorate disadvantageously.

DISCLOSURE OF INVENTION

Technical Problem

To overcome the disadvantages, an object of the present invention is to provide a mobile terminal structured to reduce a bad effect on durability and reliability of electric/electronic parts mounted in an electric control unit, when a vibration motor provided in the mobile terminal is driven, and to makes a user sense the vibration generated by the driving vibration motor easily.

Solution to Problem

To achieve these objects and other advantages and in accordance with the purpose of the embodiments, as embodied and broadly described herein, a mobile terminal includes a case comprising an electric control unit in which electric/electronic parts are mounted; a battery cover coupled to a rear surface of the case; and a vibration motor coupled to an inner surface of the battery cover.

A groove may be formed in each of the case and the electric/electronic parts mounted in the case, with a shape corresponding to the vibration motor.

A hole having a shape corresponding to the vibration motor may be formed in the case and a groove having a shape corresponding to the vibration motor may be formed in the electric/electronic parts mounted in the case.

A buffer pad may be disposed between the vibration motor and the electric/electronic parts.

The electric/electronic parts may include a printed circuit board, and the vibration motor may include an elastic terminal configured to contact with a connecting terminal mounted in the printed circuit board so as to connect the vibration motor to the printed circuit board electrically.

A portion near the hole of the case may be formed of a metallic material.

A groove having a shape corresponding to the vibration motor may be formed in the battery cover.

The battery cover may include a support wall configured to surround the vibration motor.

A hook configured to be coupled to a rear surface of the case may be formed in an outer surface of the support wall.

The mobile terminal may further include an antenna coupled to an inner surface of the battery cover.

The mobile terminal may further include a wireless charging coil coupled to an inner surface of the battery cover.

The mobile terminal may further include a magnetic for mobile terminal resting coupled to an inner surface of the battery cover.

Advantageous Effects of Invention

According to at least one embodiment of the disclosure, the mobile terminal may minimize the risks affecting the durability and the reliability of the electric/electronic parts mounted in the electric control unit when the vibration motor is driven. Also, the user can easily sense the vibration of the vibration motor.

Furthermore, the noise generated by the vibration may be reduced as much as possible, using the hook provided in the support wall or the buffer pad. The groove may be formed in the battery cover or the printed circuit board such that the overall thickness of the mobile terminal may not be increased.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF DRAWINGS

The embodiments will be described in detail with reference to the following drawings in which like reference numerals refer to like elements wherein:

FIG. 1 is a block diagram of a mobile terminal according to one embodiment of the present disclosure;

FIG. 2 is a front perspective diagram of a mobile terminal according to one embodiment of the present invention;

FIG. 3 is a rear perspective diagram of a mobile terminal according to one embodiment of the present disclosure;

FIG. 4 is a plane view illustrating a battery cover provided in a mobile terminal according to one embodiment of the present invention;

FIG. 5 is a perspective diagram illustrating a portion of a battery cover provided in a mobile terminal, in which a vibration motor is disposed, according to one embodiment of the present invention;

FIG. 6 is a rear view illustrating a case having a battery cover separated there from in a mobile terminal according to one embodiment of the present invention;

FIG. 7 is a perspective diagram illustrating a predetermined portion on a printed circuit board of a mobile terminal according to one embodiment of the present invention, corresponding to a vibration motor; and FIG. 8 is a sectional diagram of a mobile terminal according to one embodiment of the present invention.

MODE FOR THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being connected with another element, the element can be directly connected with the other element or intervening elements may also be present. In contrast, when an element is referred to as being directly connected with another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such a sensing unit 140 may include a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch' If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. At this time, the rear case 102 may further include a battery cover 103 for covering a surface of the rear case 102. In case the battery is a built-in type, the battery cover 103 may be coupled to the rear case 102. In case the battery is a replaceable type, the battery cover 103 may be mountable by the user easily.

In case the battery is the built-in type, the rear case 102 need not cover the overall area of the mobile terminal. As shown in FIG. 6 illustrating the rear case of the mobile terminal, the rear case may partially cover the mobile terminal.

If the battery cover 103 covers the whole rear side of the rear case 102, it may include an opening 103' (see FIG. 4) configured to expose a camera 121' or an audio output unit 152' externally.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the third manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user s command can be inputted by a user s touch.

FIG. 3 is a perspective diagram of a backside of the terminal shown in FIG. 2.

Referring to FIG. 3, the camera 121 can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the camera 121 has low pixels enough to capture and transmit a picture of user s face for a video call, while the latter camera 121 has high pixels for capturing a general subject for photography without transmitting the captured subject. In addition, each of the cameras 121 and 121 can be installed at the terminal body to be rotated or popped up.

A flash 123 and a mirror 124 are additionally provided adjacent to the camera 121.

The flash 123 projects light toward a subject in case of photographing the subject using the camera 121. In case that a user attempts to take a picture of the user (self-photography) using the camera 121, the mirror 124 enables the user to view user s face reflected by the mirror 124.

The additional audio output unit 152 can be provided to the backside of the terminal body. The additional audio output unit 152 is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

FIG. 4 is a plane view illustrating a battery case provided in a mobile terminal according to one embodiment of the present invention. The battery cover 103 of the present embodiment may include a vibration motor 200 configured to apply vibration to the mobile terminal. In the conventional mobile terminal, such the vibration motor 200 is typically provided in the electric control unit of the case 101 and 102. However, one characteristic the present embodiment has is that the vibration motor 200 provided in the mobile terminal is arranged in a portion of the battery cover 103 which is directly in contact with the floor or table when the user put the mobile terminal 100 on the floor or table.

The vibration motor 200 arranged in the battery cover 103 may put less influence on the electric/electronic parts mounted in the electric control unit, such that the durability and reliability of the electric/electronic parts can be improved. The battery cover 103 may include a mounting portion 104a and 104b for the vibration motor 200, to mount the vibration motor 200 thereto stably.

FIG. 5 is a perspective diagram illustrating a portion (or a mounting portion 104a and 104b) of the battery cover 103 provided in a mobile terminal 100, in which the vibration motor 200 is disposed, according to one embodiment of the present invention. The vibration mounting portion 104a and 104b may include a groove 104a having a corresponding shape to the vibration motor 200 as the mounting portion or a support wall 104b surrounding the vibration motor 200 as the mounting portion.

The mounting portion 104a and 104b may prevent the vibration motor from separating or breaking away from the battery cover 103 due to the vibration. The mounting portion 104a and 104b may reduce the thickness of the mobile terminal 100 as much as the depth of the groove 104a, when the groove 104a is formed.

The battery cover 103 may further include a hook 105 formed in an outer surface of the support wall 104b. The hook 105 may be coupled to the groove formed in the rear case 102 to couple the battery cover 103 to the case 102 stably and securely. Especially, the vibration generated from the battery cover 103 coupled and decoupled when the vibration motor 200 is vibrated.

The vibration motor 200 is driven by the electric power applied thereto and then the vibration motor 200 had better be connected to the power supply unit 190, when the battery cover 103 is coupled to the case 102 of the mobile terminal. For that, the vibration motor 200 may include an elastic terminal 205. The elastic terminal 205 may contact with a connecting terminal 208 of a printed circuit board 185 arranged in the electric control unit of the case 102 and 102 to be provided with the electric power by the power supply unit 190.

It is preferred that the elastic terminal 205 is elastically moved or the contact surface of the elastic terminal 205 is curved, for the reliability of the contact with the connecting terminal 208. Examples of the elastic terminal 205 may include a spiral spring formed of a conductive material, a C-clip, a leaf spring and the like.

FIG. 6 is a rear view illustrating a case having a battery cover 103 separated there from according to one embodiment of the present disclosure. In case of a replaceable type battery, the rear case 102 may cover the battery to prevent the electric/electronic parts mounted in the electric control unit from being exposed outside. In case of a butyl-in type battery, the battery cover 103 may protect a rear surface of the mobile terminal 100 such that the electric/electronic parts mounted in the electric control unit may be partially exposed.

In the present embodiment, a hole 102 or a groove may be formed in the rear case 102, corresponding to the vibration motor 200. As the vibration motor 200 is relatively thick, the hole 102 or the groove may prevent the overall thickness of the mobile terminal from being increased by the vibration motor 200. In the embodiment shown in FIG. 6, the rear case 102 may be directly mounted on a printed circuit board 185 through the hole 102 corresponding to the vibration motor 200.

The connecting terminal 208 may be exposed to the rear surface through the hole 102 and it may electrically contact with the elastic terminal 205 of the vibration motor 200, only to apply the electric power to the vibration motor 200.

FIG. 7 is a perspective diagram illustrating an exposed portion of the printed circuit board after the rear case 102 is detached. The printed circuit board 185 has a hole formed corresponding to the vibration motor, in other words, in the contact portion with the vibration motor 200 such that the overall thickness of the mobile terminal cannot be increased by the thickness of the vibration motor 200. In addition, a buffer pad 207 may be further provided between the printed circuit board 185 and the vibration motor 200 to prevent the noise caused by collision between the printed circuit board 185 and the vibrating vibration motor 200.

As shown in FIG. 6, a portion near the hole formed in the rear case 102, corresponding to the vibration motor 200, may be formed of a metallic material 102a, not an injection molding form. Accordingly, the strength and rigidity of the portion near the vibration motor may be improved enough to reduce the damage caused by vibration.

FIG. 8 is a perspective diagram illustrating a corresponding portion of the printed circuit board 185 to the vibration motor 200 in the mobile terminal according to one embodiment of the disclosure. The shape of the printed circuit board 185 and the battery cover 103, corresponding to the vibration motor 200, is shown in FIG. 8.

As mentioned hereinabove, the vibration motor 200 has one surface attached to the battery cover 103 and the other surface in contact with the printed circuit board 185 when coupled to the battery cover 103. Predetermined portions of the battery cover 103 and the printed circuit board 185 may be recessed, corresponding to the vibration motor 200, such that the overall thickness of the mobile terminal 100 may not be increased.

When the battery cover 103 is coupled to the rear case 102, the elastic terminal 205 contacts with the connecting terminal 208 of the printed circuit board 185. The hook 1045 projected from an outer surface of the support wall is coupled to the rear case 102 to prevent the rear case 102 from being spaced apart from the battery cover 103. Accordingly, the noise caused by the vibration of the vibration motor can be reduced. The buffer pad 207 formed of an elastic material such as silicon, rubber and the like may be disposed between the printed circuit board 185 and the vibration motor 200, to reduce the noise.

Moreover, the battery cover 103 according to the embodiments of the disclosure may include an antenna 116 which is usually mounted in the rear case 102 of the conventional mobile terminal. Examples of the antenna 116 may include a Bluetooth/Wi-Fi antenna, a GPS antenna and the like.

The Bluetooth/Wi-Fi antenna is for a short range communication and the NFC antenna is for near field wireless communication which enables sending/receiving of information in a near field (e.g., within 10 cm). The GPS antenna is for receiving location information.

NFC is one of next generation near field (or short range) communication technologies drawing public attention, which has strengthened security and a relatively low price a substantially short communication range. The NFC enables data reading and writing and devices trying to use the NFC need no setting, while the Bluetooth needs special setting. Accordingly, a short range communication function is recently added to a mobile terminal.

Furthermore, a wireless charging coil 193 for wireless charging may be provided in an inner surface of the battery cover 103. The wireless charging coil 193 uses electromagnetic induction in charging a battery wirelessly. The wireless charging coil 193 sends electric currents in a wireless charging device and forms an electromagnetic field. When the mobile terminal 100 is put on the wireless charging device after that, the electric currents flow to the wireless charging coil 193 attached to the battery cover of the mobile terminal 100 to be charged to the mobile terminal 100.

Frequencies may be differentiated based on the output of the electric currents transmitted to the wireless charging coil 193 of the mobile terminal. Generally, the electric currents for a small-sized electric apparatus such as the mobile terminal 100 uses relatively low frequencies which are hundreds of kHz or less.

The antenna 116 and the wireless charging coil 193 have to be electrically connected to the printed circuit board 185 mounted in the electric control unit. Accordingly, each of the antenna 116 and the wireless charging coil 193 includes a terminal. A connecting terminal 208 of the printed circuit board 185 which is connected with the antenna 116 and the wireless charging coil 193 is exposed to the rear case 102.

Moreover, to place the mobile terminal on a mobile terminal rest, a magnetic 220 is attached to the rear surface of the battery cover 103 provided in the conventional mobile terminal 100. However, the magnetic spoil the beauty of the mobile terminal. The battery cover 103 of the mobile terminal according to the embodiments of the disclosure may include a magnetic 220 attached to an inner surface thereof. Without the conventional magnetic 220 attached to the outer surface of the battery cover 103, the mobile terminal 100 may be placed on the mobile terminal rest easily.

As mentioned above, the mobile terminal 100 according to at least one embodiment of the disclosure may minimize the risks affecting the durability and the reliability of the electric/electronic parts mounted in the electric control unit when the vibration motor 200 is driven. Also, the user can easily sense the vibration of the vibration motor 200.

Furthermore, the noise generated by the vibration may be reduced as much as possible, using the hook 105 provided in the support wall or the buffer pad 207. The groove may be formed in the battery cover 103 or the printed circuit board 185 such that the overall thickness of the mobile terminal may not be increased.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A mobile terminal comprising:
   a case comprising an electric control unit in which electric/electronic parts are mounted;
   a printed circuit board arranged in the electronic control unit;
   a battery cover coupled to a rear surface of the case;
   a vibration motor provided between the rear surface of the case and the battery cover, the vibration motor being coupled to an inner surface of the battery cover,
   a mounting portion provided in the battery cover mounting the vibration motor, the mounting portion comprising:
      a first groove having a shape corresponding to the vibration motor such that a first surface of the vibration motor is attached to the mounting portion; and
      a support wall surrounding the vibration motor,
   a hole provided in the rear surface of the case, the hole exposing a part of the printed circuit board so as to electrically connect the vibration motor to the printed circuit board; and
   a second groove provided in the printed circuit board such that a second surface of the vibration motor, different than the first surface, is attached to the printed circuit board.

2. The mobile terminal of claim 1, wherein the hole has a shape corresponding to the vibration motor.

3. The mobile terminal of claim 1, wherein a buffer pad is disposed between the vibration motor and the printed circuit board.

4. The mobile terminal of claim 1, further comprising:
   an elastic terminal configured to contact with a connecting terminal mounted in the printed circuit board so as to connect the vibration motor to the printed circuit board electrically.

5. The mobile terminal of claim 1, wherein a portion near the hole of the case is formed of a metallic material.

6. The mobile terminal of claim 1, wherein a hook configured to be coupled to a rear surface of the case is formed in an outer surface of the support wall.

7. The mobile terminal of claim 1, further comprising:
   an antenna coupled to an inner surface of the battery cover.

8. The mobile terminal of claim 1, further comprising:
a wireless charging coil coupled to an inner surface of the battery cover.

9. The mobile terminal of claim 1, further comprising:
a magnet for mobile terminal resting coupled to an inner surface of the battery cover.

\* \* \* \* \*